Aug. 14, 1923. 1,464,858
P. J. WILLIAMS
ACCELERATOR
Filed Sept. 30, 1922
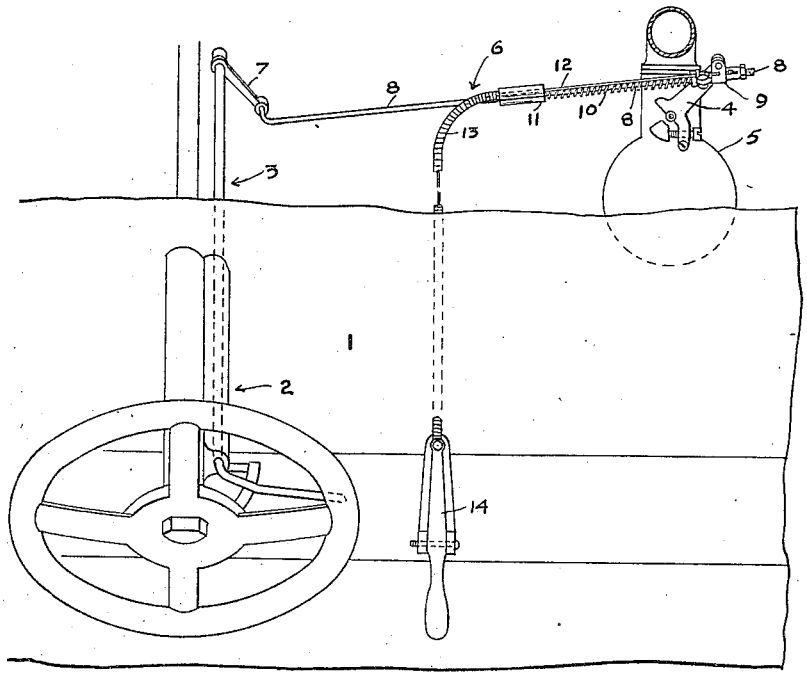
FIG. 1
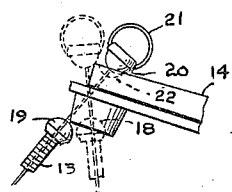
FIG. 3
FIG. 2
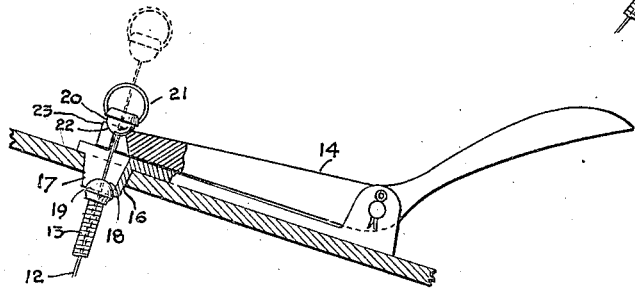
FIG. 4
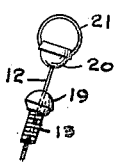
INVENTOR
P. J. WILLIAMS
ATT'YS.

Patented Aug. 14, 1923.

1,464,858

UNITED STATES PATENT OFFICE.

PERCY J. WILLIAMS, OF SAN FRANCISCO, CALIFORNIA.

ACCELERATOR.

Application filed September 30, 1922. Serial No. 591,613.

*To all whom it may concern:*

Be it known that I, PERCY J. WILLIAMS, a citizen of the United States, residing at San Francisco, in the county of San Francisco and State of California, have invented new and useful Improvements in Accelerators, of which the following is a specification.

This invention relates to improvements in internal combustion engine accelerators of the type which will permit of the independent operation of the hand and foot operating means therefor, and has especial reference means for connecting the pedal of the foot operating mechanism to a flexible element and flexible cable containing the same, which flexible element and cable constitute means of operative connection between the pedal and other accelerator mechanism.

In accelerators of the character described, breakage of or damage to the flexible connecting element, between the pedal and the accelerator mechanism, frequently occurs at or adjacent the point of connection of said flexible element with the pedal, due to the failure of the person setting up or taking down the connection, to follow instructions or due to careless manipulation of the parts in making or disassembling the connection. The purpose of the invention is to provide a construction which will prevent damage to the parts above referred to regardless of the manner in which the parts are handled when being assembled or disassembled, there being provided a novel joint arrangement which is simple as to construction, inexpensive and will greatly facilitate and expedite the operation of connecting said flexible operating element and the flexible casing therefor, with the pedal.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Figure 1 represents a broken top plan view of a portion of an automobile showing the accelerator of my invention as when applied thereto.

Figure 2 represents a side elevation of the pedal of the foot mechanism showing the pedal partly in section and illustrating in side elevation the detailed construction of my invention.

Figure 3 is a fragmentary side elevation showing the manner in which the parts of the joint may be set up or taken down.

Figure 4 is a side elevation of the joint members on the wire and cable.

In the drawings wherein there is illustrated one embodiment of the type of accelerator with which my invention is used, 1 designated a foot-board of an automobile through which board the usual steering mechanism 2 extends and upon which steering mechanism a standard hand throttle controlling means 3 is mounted. The means 3 is connected with the throttle valve crank arm 4 of the usual carburetor 5 through the medium of accelerator mechanism generally designated 6. The accelerator mechanism comprises a longitudinally extensible or resilient connection between the crank arm 4 and the crank arm 7 of the hand operating means 3. The extensible connection in this instance comprises a rod 8 having slidably mounted thereon a sleeve 9, which sleeve is pivotally connected with the crank arm 4 and is held extended by a helical expansion spring 10 surrounding the rod 8 and abutting at its ends said sleeve 9 and a collar 11 fixed to the rod 8.

Extending from a point where, at one end it is fixed to the sleeve 9, is a flexible, preferably wire, operating element 12 which passes through a flexible cable 13 fixed to the collar 11 and is then directed up to the floor board of the vehicle, at which point it is connected with by the means of my invention to a pedal 14. The flexible tube or cable 13 is connected to the pedal mounting and collar 11 respectively.

My invention relates particularly to the means of connection between the tube or cable 13 and flexible element 12 with the pedal mounting and pedal. The pedal mounting is provided with a socket 16 which opens out through one side in the form of a slot 17 through which slot the flexible element 12 is inserted in making the connection. The socket also opens upwardly through the pedal mounting to permit the flexible element to move longitudinally through the mounting and slot upon operation of the pedal. The inner end 18 of the socket is concaved and rounded to receive a rounded head member 19 fixed in any suitable manner to the upper end of the cable 13. The head 19 will be capable of free movement in the socket, which, as will be later described, will prevent the breaking or damaging of the flexible wire element 12. The wire element 12 is provided on its upper end with a semi-spherical or rounded head member 20 corresponding to the head 19. Attached to the upper side of said member is a finger piece 21 in the form of a ring, which finger piece will permit of the effective use of the fingers or a tool, in making or taking down the connection. The upper side of the pedal is provided with a substantially semi-spherical socket 22 which opens on the lower side and outer end of the pedal by reason of its being slotted as at 23. The member 20 fits snugly in the semi-spherical socket 22 and will turn freely or move in various directions in accordance with the movement of the flexible element so as to avoid bending or breaking said flexible element.

To connect the flexible element and tube with the pedal and mounting, the pedal is allowed to rest upon the mounting as shown in Figure 3 of the drawing, and with the tube and element 12 held in a downwardly and outwardly inclined position with relation to the pedal, the element 20 is brought to engage in the socket 22 with the flexible element 12 extending partly into the slot 23, as shown in Figure 3. With the end of the element 12 thus anchored by pulling downwardly on the cable, said cable will move downwardly on the wire 12 and when the head 19 clears the lower end of the socket 12, the operator releases his hold on the tube allowing it to move upwardly and to snap into place, permitting the member 19 to engage snugly in the socket 16. It will thus be seen that the operation of connecting the wire element and flexible tube may be easily and expeditiously carried out.

To disconnect the tube and flexible element, the operator takes hold of the ring or finger piece, or by inserting an instrument through the finger piece, pulls upwardly until the head 20 is clear of the socket 22. By then moving the head 20 forwardly so that the wire 12 will pass outwardly through the slots 23 and 17, the member 19 will turn in the socket and snap out of engagement with said socket, thereby completely disengaging the tube and member 12 from the pedal and mounting.

Heretofore it has been customary to simply permit the upper end of the tube to have engagement in a cylindrical socket and in disconnecting the wire from the pedal it frequently happened that the pedal was depressed so that the wire could be grasped between the pedal and mounting and moved outwardly through the slot in the pedal. Due to the failure of the tube to move freely upon such outward movement of the wire, the wire was then caused to bend or break at the point where bent outwardly against the tube. By the arrangement of my invention this will not take place since when the head 20 is lifted upwardly out of the socket and then moved forwardly to bring the wire through the slot, the rounded head 19 will turn in the socket and the tube will likewise turn so as to avoid bending or straining of the wire against the sides of the tube.

The joint may be set up or taken down in various ways other than herewith shown and described, inasmuch as the ball and socket joint management of the invention will prevent breaking, bending or damaging of the wire and cable.

While the joint of my invention is primarily designed for use in accelerators I wish it to be understood that I may use the joint with other apparatus or appliances wherein a movable member such as a lever, arm or pedal and a stationary member corresponding to the pedal mounting herein disclosed are to be connected with a flexible element and tubular cable or casing therefor.

It will be seen that one of the principal features of the invention is the provision of a swivel or ball and socket-like joint between the flexible wire and pedal or like member and a similar joint between the cable and stationary member or pedal mounting.

It will be noted that when the members 19 and 20 are moved away from one another by virtue of pulling on the element 12 or pushing downwardly on the cable 13, said members 12 and 13 will be placed under tension. When the members 19 and 20 are engaged in the sockets therefor, they have been moved apart sufficiently to place the members 12 and 13 under tension and this serves to effectively hold the members in the sockets at all times.

I claim:

1. A joint construction embodying a stationary member, a movable member, a flexible tube, a flexible element relatively movably mounted in the tube, and ball and socket connections joining the element and the tube with said members.

2. A joint construction embodying a stationary member, a movable member, a flexible tube having a swivel connection with the stationary member, a flexible element extending through the tube and capable of movement relative thereto and a swivel connection between the flexible element and movable member.

3. In a joint construction a stationary member, a movable member, said members having sockets therein, a flexible tube having a rounded portion movable in the socket, and a flexible element extending through the tube and having a rounded head thereon engaging in the other socket.

4. In a joint construction a stationary member, a movable member, said members having sockets therein, a flexible tube having a rounded portion movable in the socket, a flexible element extending through the tube and having a rounded head thereon engaging in the other socket and a finger piece on said last named member.

5. In an accelerator of the character described, a stationary member, a pedal mounted on the stationary member, said stationary member having a socket opening on the upper side and at one end of the stationary member, said pedal having a socket on its upper side opening on the lower side and forward end of the pedal, a flexible tube, a member on said tube engaging in the socket, a flexible element movable in the tube and extending into said sockets so as to be movable through the open sides of said sockets and a head on the flexible element engaging in the socket in the pedal.

6. A joint construction embodying a stationary member, a movable member, both having sockets therein, a flexible tube, a head on said tube engaging in the socket of the stationary member and capable of free movement therein, a flexible element operating in the tube, a head on the flexible element engaging in the socket on the movable member and being freely movable therein.

7. In an accelerator the combination with a pedal and a stationary member on which the pedal is mounted and an accelerator mechanism associated with the throttle valve, of means of connection between the accelerator mechanism and the pedal comprising a flexible tube, a flexible element operating within the tube, a swivel connection between the tube and stationary member and a swivel connection between the flexible element and pedal.

8. In accelerator mechanism, a pedal, a support upon which said pedal is mounted, said pedal and support having registering slotted sockets, a flexible tube, a head on the tube engaging and turning freely in the socket of the pedal support, a flexible element slidable in the tube and capable of movement through the slots of the sockets into and out of position for connection with the pedal and a head on said flexible element engaging and turning freely in the socket of the pedal.

9. In accelerator mechanism, a pedal, a support upon which said pedal is mounted, said pedal and support having registering slotted sockets, a flexible tube, a head on the tube engaging and turning freely in the socket of the pedal support, a flexible element slidable in the tube and capable of movement through the slots of the sockets into and out of position for connection with the pedal, a head on said flexible element engaging and turning freely in the socket of the pedal and a finger piece attached to the last named member.

10. A joint construction embodying a stationary member, a movable member, a flexible tube, a flexible element slidable in the tube, said members having sockets therein, elements on the flexible element and tube engaging and capable of free movement in said sockets, said flexible element and tube being under tension when said socket engaging members are in position.

PERCY J. WILLIAMS.